Inventors
Ronald Frederick Spurr
William Martin
By Peck & Peck
ATTORNEYS

United States Patent Office 3,363,108
Patented Jan. 9, 1968

3,363,108
COLOR DEVIATION APPARATUS HAVING A CHOPPER COLORED TO THE PREDETERMINED SHADE
Ronald Frederick Spurr, Biggin Hill, and William Martin, Greenford, England, assignors to H. Tinsley & Co. Limited, London, England, a company of Great Britain
Filed July 21, 1964, Ser. No. 384,191
Claims priority, application Great Britain, July 26, 1963, 29,802/63
2 Claims. (Cl. 250—226)

ABSTRACT OF THE DISCLOSURE

The invention provides apparatus for directing a beam of light towards a sectored rotatable shutter behind which is located a sample whose color is to be compared with the color of the surface of the shutter. Light scattered from the shutter surface only is detected by one device and light from the sample and shutter is received by another device, the amplitude and polarity of the signals received by the devices being a measure of the color difference.

---

This invention relates to improvements in testing apparatus.

There are many industrial applications where it is desirable to test the color of a product being manufactured in order to ensure that the color of the product is of the required shade. Such applications are, for example in the manufacture of paints, dyed fabrics and in the production of flour.

According to the present invention, apparatus for detecting the departure of a color from a predetermined shade comprises means for directing a beam of light towards a location at which is to be disposed the color under test, a rotatable shutter arranged to interrupt the light beam and colored on the face illuminated by the beam to substantially the predetermined shade, a first light-sensitive device arranged to sense light scattered from both the illuminated face of the shutter and from the color under test to derive a first signal having a phase and amplitude respectively representing the sense of departure of the color under test from the predetermined shade and the magnitude of such departure, a second light sensitive device arranged to sense light scattered from the illuminated face of the shutter to derive a second signal and means for comparing the first and second signals to derive an output D.C. signal having a polarity and magnitude respectively representing said sense of departure and the amplitude thereof.

One embodiment of the invention will now be described by way of example, reference being made to the accompanying drawings in which.

Figures 1, 2:
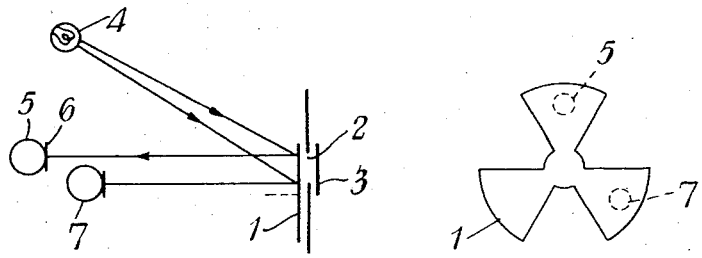
FIG. 1 is a schematic diagram of part of the apparatus.
FIG. 2 is an elevational view of the shutter showing the relative positions of two photo-cells.
Figure 3:
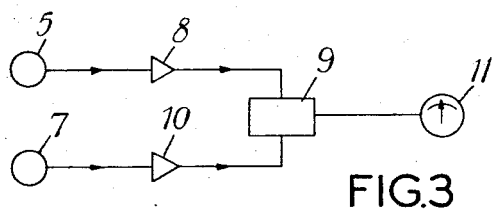
FIG. 3 is a block schematic circuit diagram.
Figure 4:
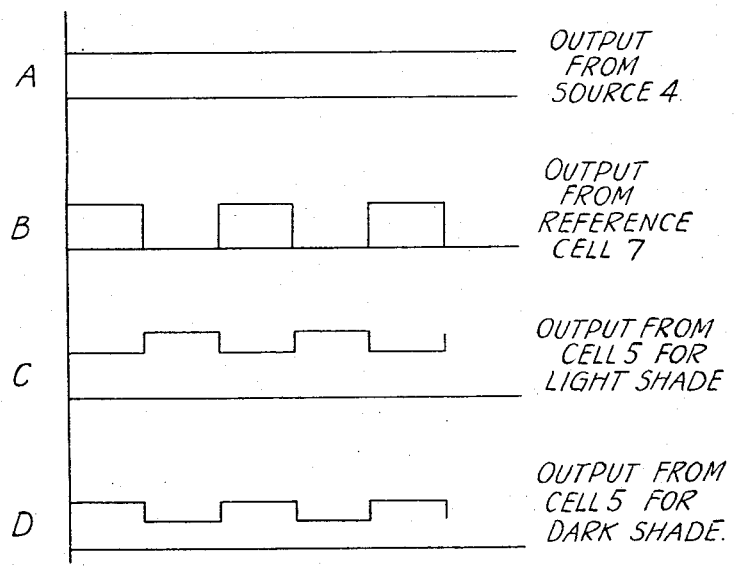
FIG. 4 illustrates certain waveforms.

The apparatus comprises a rotatable shutter 1 in the form of three sectors of a circle, equiangularly disposed about the centre and each subtending an angle of 60° to the centre. The shutter is mounted for rotation about its axis so that the shutter sectors are in turn rotated in front of an aperture 2 which is adjustable. On the side of the aperture 2 remote from the shutter 1 means (not shown) is provided for locating a sample under test. The sample may, for example, in the case of paint manufacture, be a card 3 painted with the color to be tested. The face of the shutter 1 remote from the aperture 2 is colored substantially to the desired color shade and a light source 4 is provided to direct a beam of light on to the face of the shutter 1 at an angle of 45° to the general plane thereof and through the shutter on to the test card 3. FIG. 4A illustrates the steady output from the source 4. A first light-sensitive device in the form of a detector barrier layer photo-cell 5 associated with a suitable light filter 6 is arranged to detect light scattered from the illuminated face of the rotating shutter 1 and from the test card 3. A second light-sensitive device in the form of a further photo-cell is provided as a reference cell to detect light scattered from the shutter 1 and not from the test card 3, and is so disposed that the signal from both cells 5 and 7 due to light scattered from the shutter 1 only are substantially in phase with each other. The output from the detector cell 5 is illustrated in FIG. 4C for the case where the color of the test card 3 is lighter than that of the shutter 1 and in FIG. 4D for the case where the color of the test card 3 is darker. This output passes through an A.C. amplifier 8 to a phase sensitive detector 9 and the output from the reference photo cell 7 (shown in FIG. 4B) passes through a second A.C. amplifier 10 to the phase sensitive detector 9 which produces a D.C. output signal having a polarity representing the relative phases of the two outputs from the cells 5 and 7 and a magnitude corresponding to the difference in the amplitudes of the two outputs. The D.C. output is supplied to a centre-reading meter 11.

In the operation of the device a reference color card is disposed in place of the test card 3 outside the shutter 1 and the light beam directed on to this card is effectively chopped by the rotating shutter 1 which has its illuminated face colored to substantially the same shade as the reference card. Any difference in the amount of light received by the detector cell 5 from the illuminating face of the shutter 1 and from the reference card results in an alternating output from the cell 5. This output is in phase with that of the reference cell 7 (FIGS. 4D and 4B) if the amount of light received from the reference card is less than that received from the shutter 1 and is an anti-phase therewith (FIGS. 4C and 4B) if it is greater. The phase-sensitive detector 9 compares the outputs from the cells 5 and 7 (after amplification) and the meter 11 provides a visual indication of both the sense and magnitude of the difference in the amount of light received by the detector cell 5. The aperture 2 is then adjusted until the detector cell 5 receives the same amount of light from both the shutter 1 and the reference card so that there is no A.C. output from this cell and the meter 11 reads zero. The reference card is then removed and replaced by a test card painted with the color under test and any difference in the shade of the color on the test card with respect to the reference card is detected by the detector cell 5 and indicated on the meter 11. The D.C. signal to the meter 11 may also be used to operate an alarm and even remotely to control the process producing the color under test to correct any departure of the color shade being produced from the desired shade.

It will be appreciated that although the apparatus has been described to test color in a batchwise manner it could be used continuously e.g. in the manufacture of colored textiles, by advancing the textile material continuously past the shutter and even to test the color of a pigmented powder or even flour by flowing the particulate material in a continuous stream past the shutter.

It will also be appreciated that the shutter 1 may be composed of any number of sectors each substending equal angles to the centre of the shutter and that the cells 5 and 7 are so disposed relatively to different sectors of the shutter 1 that each receives light from the associated sector simultaneously and for the same period of time so that the cells 5 and 7 produce in phase outputs when the color of the test card 3 is darker than the reference card used to set up the apparatus.

We claim:

1. Apparatus for detecting the departure of a color from a predetermined shade comprising means for directing a beam of light towards a location, a color under test positioned at said location, a rotatable shutter colored to the predetermined shade and arranged to interrupt the light beam, a first light-sensitive device arranged to sense light scattered from both the illuminated face of the shutter and from the color under test to derive an output signal, means for deriving a reference signal determined by rotation of the shutter, and means for comparing the phases of the output and reference signals to derive an output D.C. signal having a polarity and magnitude respectively representing the sense and magnitude of departure of said color from the predetermined shade, characterised in that the means for deriving a reference signal comprises a second light-sensitive device arranged to receive light scattered only from the illuminated face of the shutter, the second light sensitive device being disposed relative to the first light-sensitive device and the shutter such that the reference signal is in phase with or 180° out of phase with the output signal.

2. Apparatus for detecting the departure of a color from a predetermined shade in accordance with claim 1, wherein adjustable means is provided between the color under test and the first light-sensitive device to cause the first light-sensitive device to receive the same amount of light from both the rotatable shutter and the color under test.

References Cited

UNITED STATES PATENTS

| | | | |
|---|---|---|---|
| 2,808,755 | 10/1957 | Miller | 250—226 |
| 3,237,509 | 3/1966 | Fielding | 88—14 |

WILLIAM F. LINDQUIST, *Primary Examiner.*

RALPH G. NILSON, *Examiner.*

M. ABRAMSON, *Assistant Examiner.*